US008769302B2

(12) United States Patent
Mittelstadt et al.

(10) Patent No.: US 8,769,302 B2
(45) Date of Patent: Jul. 1, 2014

(54) ENCRYPTING DATA AND CHARACTERIZATION DATA THAT DESCRIBES VALID CONTENTS OF A COLUMN

(75) Inventors: Roger A. Mittelstadt, Byron, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/273,725

(22) Filed: Oct. 14, 2011

(65) Prior Publication Data

US 2013/0097430 A1 Apr. 18, 2013

(51) Int. Cl.
*G06F 11/30* (2006.01)
*G06F 12/14* (2006.01)
*G06F 17/30* (2006.01)
*H04L 9/08* (2006.01)

(52) U.S. Cl.
CPC .... *G06F 17/30289* (2013.01); *G06F 17/30424* (2013.01); *H04L 9/0836* (2013.01)
USPC .......................................................... 713/189

(58) Field of Classification Search
CPC .................... G06F 17/30424; G06F 17/30289; H04L 9/0836
USPC .......................................................... 713/189
See application file for complete search history.

(56) References Cited

U.S. PATENT DOCUMENTS

| | | | | |
|---|---|---|---|---|
| 7,409,558 | B2 | 8/2008 | Beukema et al. | |
| 7,870,398 | B2 | 1/2011 | Perng et al. | |
| 2005/0149733 | A1 | 7/2005 | Catherman et al. | |
| 2006/0047953 | A1 | 3/2006 | Beukema et al. | |
| 2008/0021914 | A1* | 1/2008 | Davies et al. | 707/101 |
| 2008/0033960 | A1 | 2/2008 | Banks et al. | |
| 2008/0133935 | A1* | 6/2008 | Elovici et al. | 713/193 |
| 2008/0183656 | A1* | 7/2008 | Perng et al. | 707/2 |
| 2009/0119508 | A1 | 5/2009 | Lewis et al. | |
| 2010/0131752 | A1 | 5/2010 | Flegel | |

FOREIGN PATENT DOCUMENTS

GB 2455004 A 5/2009

OTHER PUBLICATIONS

Xue Mei-Yun et al., "The Encryption Techniques of VFP Databases," Journal of Hebei University of Technology, 2003, pp. 103-107, vol. 32, No. 6.

IBM, "Autonomous Cell-Level Database Encryption and Authentication," IP.com No. IPCOM000153678D, Jun. 6, 2007, pp. 1-9.

(Continued)

*Primary Examiner* — Linglan Edwards
*Assistant Examiner* — Lawrence Cosby
(74) *Attorney, Agent, or Firm* — Owen J. Gamon; Matthew C. Zehrer

(57) ABSTRACT

A method, computer-readable storage medium, and computer system are provided. In an embodiment, in response to receiving a first command that specifies first data, a first cryptographic key, and a column identifier that identifies a column of rows in a database, the first data is encrypted into encrypted data using the first cryptographic key. The encrypted data is stored to a first row in the column in the database. In response to the receiving the first command, characterization data is created that specifies valid contents of the column of the rows. In response to receiving a query command that specifies a second cryptographic key and the column, the column is decrypted using the second key to create decrypted data. If the decrypted data does not satisfy the valid contents specified by the characterization data, an invalid cryptographic key action is performed.

12 Claims, 5 Drawing Sheets

(56) References Cited

OTHER PUBLICATIONS

Jackson, RD., et al., "Module to Module Linkage Mechanism," IP.com No. IPCOM000050907D, Dec. 1, 1982, pp. 1-8.

Luc Bouganim et al., "Chip-Secured Data Access: Confidential Data on Untrusted Servers," Proceedings of the 28th VLDB Conference, 2002, pp. 1-12, Hong Kong, China; PRISM Laboratory-France, 2002.

* cited by examiner

ENCRYPTING DATA AND CHARACTERIZATION DATA THAT DESCRIBES VALID CONTENTS OF A COLUMN

FIELD

An embodiment of the invention generally relates to database management systems that encrypt data.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query.

Databases often use cryptography, which is the practice of hiding information to ensure secrecy and includes encryption and decryption of data. Encryption is the process of converting ordinary information (plain text) into unintelligible information, known as cipher text, which is unreadable or incomprehensible by interceptors, eavesdroppers, or other unauthorized and unintended persons without secret knowledge (namely, the key needed for decryption). Databases use cryptography to encrypt data stored in the database, so that an encrypted database field remains secure even if an unauthorized person reads the encrypted data and knows which encryption algorithm was used to create the encrypted data.

SUMMARY

A method, computer-readable storage medium, and computer system are provided. In an embodiment, in response to receiving a first command that specifies first data, a first cryptographic key, and a column identifier that identifies a column of rows in a database, the first data is encrypted into encrypted data using the first cryptographic key. The encrypted data is stored to a first row in the column in the database. In response to the receiving the first command, characterization data is created that specifies valid contents of the column of the rows. In response to receiving a query command that specifies a second cryptographic key and the column, the column is decrypted using the second key to create decrypted data. If the decrypted data does not satisfy the valid contents specified by the characterization data, an invalid cryptographic key action is performed.

It is to be noted, however, that the appended drawings illustrate only example embodiments of the invention, and are therefore not considered a limitation of the scope of other embodiments of the invention.

DETAILED DESCRIPTION

Figure 1:
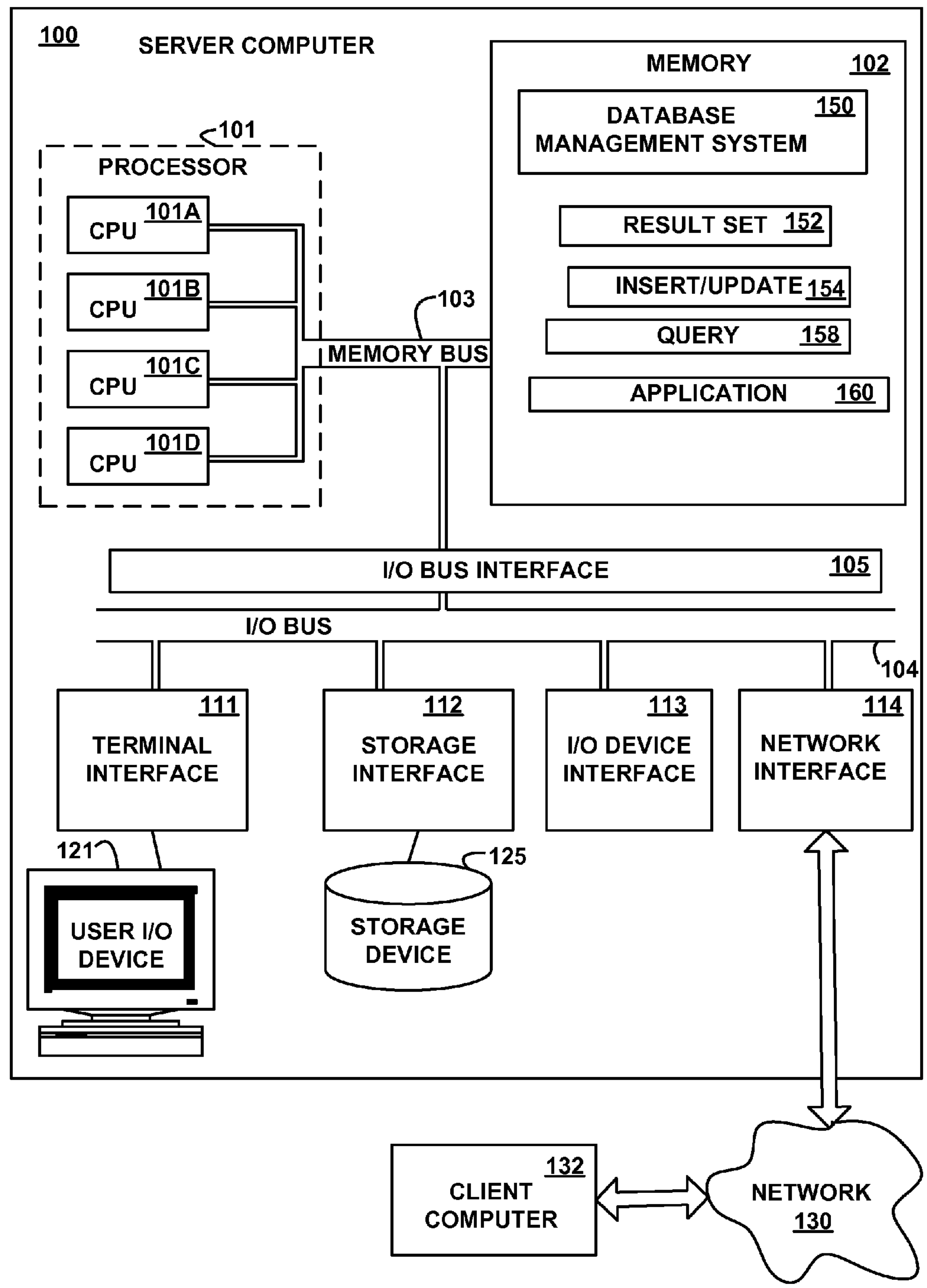
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a database management system (DBMS) 150, a result set 152, an insert/update command 154, a query 158, and an application 160. Although the DBMS 150, the result set 152, the insert/update command 154, the query 158, and the application 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database management system 150, the result set 152, the insert/update command 154, the query 158, and the application 160 are illustrated as being contained within the main memory 102, these elements are not necessarily all completely contained in the same storage device at the same time. Further, although the database management system 150, the result set 152, the insert/update command 154, the query 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, and 5. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
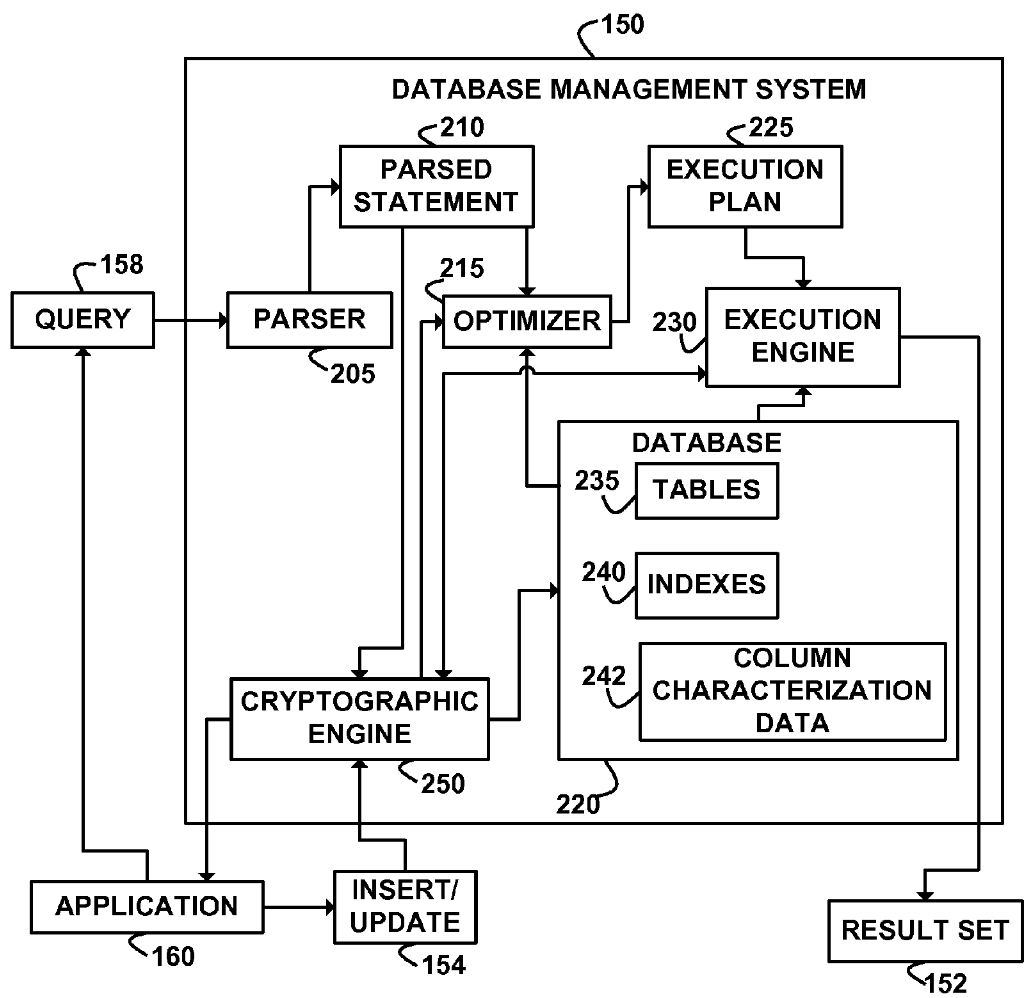
FIG. 2 depicts a block diagram of an example database management system, according to an embodiment of the invention.

FIG. 2 depicts a block diagram of an example database management system 150, according to an embodiment of the invention. The DBMS 150 comprises a parser 205, a parsed statement 210, a optimizer 215, a database 220, an execution plan 225, an execution engine 230, and an cryptographic engine 250. In another embodiment, the cryptographic engine 250 may be separate from the DBMS 150 and communicate with the DBMS 150. For example, the cryptographic engine 250 may be part of an operating system or other program. The database 220 comprises tables 235, one or more indexes 240, and column characterization data 242. The tables 235 organize data in rows, which represent individual entries, tuples, or records and columns, fields, or attributes, which define what is stored in each row, entry, tuple, or record. Each table 235 has a unique name within the database 220 and each column has a unique name within the particular table 235. The indexes 240 are data structures that inform the DBMS 150 of the location of a certain row in a table 235 in response to the indexes 240 receiving an indexed column value.

The parser 205 receives the query 158 from the application 160. The query 158 requests that the DBMS 150 search for or find a row or combination of rows of data and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158. The parser 205 generates a parsed statement 210 from the query 158, which the parser 205 sends to the optimizer 215. The optimizer 215 performs query optimization on the parsed statement 210. As a result of query optimization, the optimizer 215 generates one or more execution plans 225, using data such as resource availability, platform capabilities, query content information, etc., that is stored in the database 220. Once generated, the optimizer 215 sends the execution plan 225 to the execution engine 230, which executes the query 158 using the execution plan 225 and the indexes 240, in order to find and retrieve the data in the database tables 235 in the database 220 that satisfies the criteria of the query 158. The execution engine 230 stores the resultant data that satisfies the criteria specified by the query 158 into the result set 152, which is returned to the application 160 as a response to the query 158. In an embodiment, the DBMS 150 stores various thresholds into the execution plan 225. The DBMS 150 may receive the various thresholds from the application 160, from a user, or from a database administrator, or the thresholds may be set by a designer of the optimizer 215.

The cryptographic engine 250 encrypts the column characterization data 242, encrypts values received from the insert/update command 154 using keys received with the insert/update command 154, and stores the encrypted values to the tables 235. The cryptographic engine 250 also decrypts values read from the tables 235, in response to parsed statements. The execution engine 230 may call the cryptographic engine 250, to encrypt and decrypt data.

Figure 3:
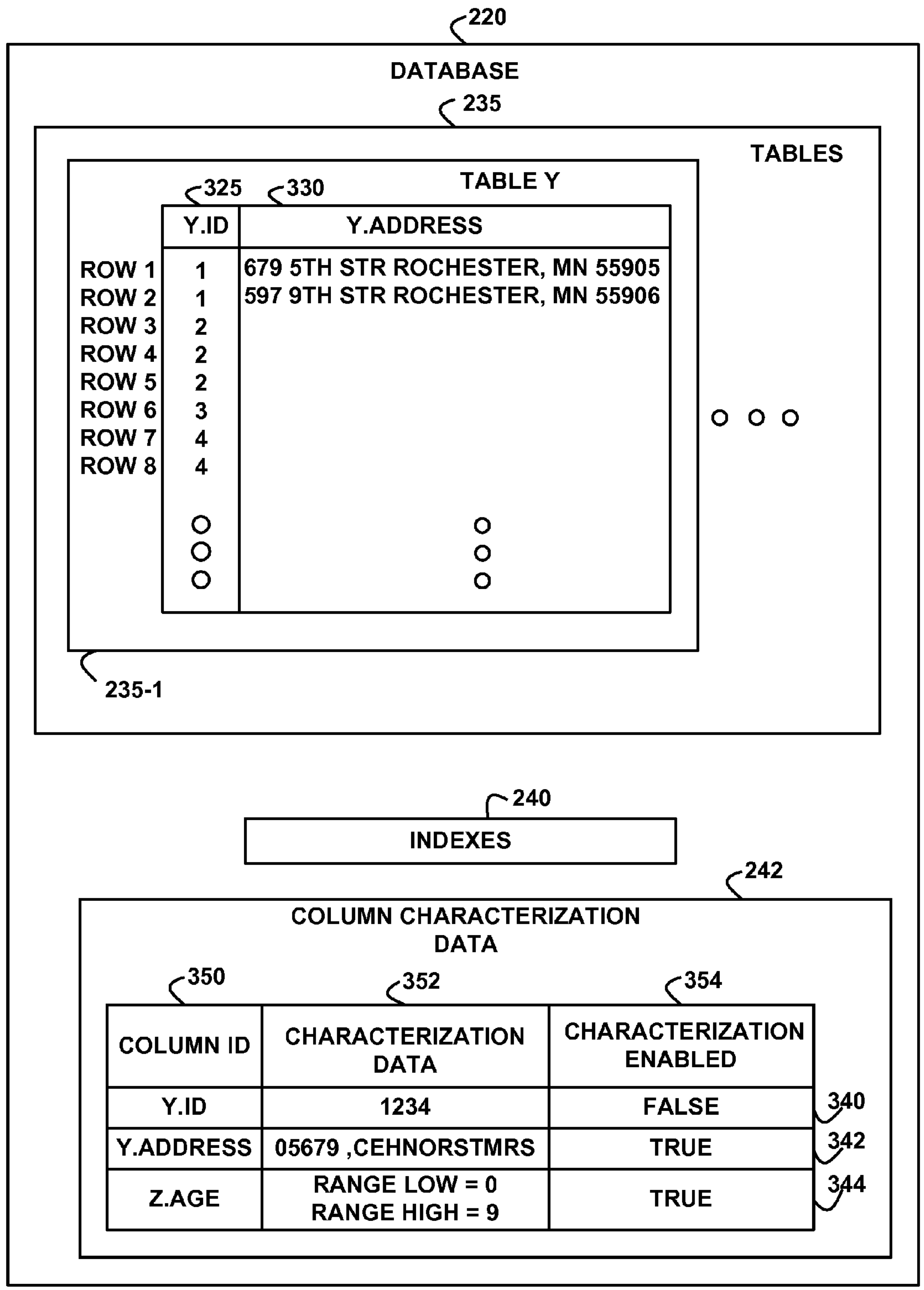
FIG. 3 depicts a block diagram of an example data structure for a database, according to an embodiment of the invention.

FIG. 3 depicts a block diagram of an example data structure for a database 220, according to an embodiment of the invention. The database 220 comprises example tables 235, indexes 240, and example column characterization data 242.

The tables 235 may comprise any number of tables, such as the example table y 235-1. The example table y 235-1 is divided into rows and columns. For example, the table y 235-1 comprises the column y.id 325 and the column y.address 330. The table y 235-1 further comprises a first row of "1" stored in the column y.id 325 and "679 5$^{th}$ Str Rochester, Minn. 55905" stored in the column y.address 330; a second row of "1" stored in the column y.id 325 and "597 9$^{th}$ Str Rochester, Minn. 55906" stored in the column y.address 330, etc. The table y 235-1 illustrates row identifiers ("row 1," "row 2," "row 3," etc.), which identify the respective rows in the table y 235-1. In another embodiment, the row identifiers are addresses (either absolute, relative, physical, logical, or virtual addresses) that identify the storage location of the respective row. In an embodiment, the row identifiers are pointed to by addresses or identifiers in the index 240. In another embodiment, the row identifiers are unique values in a column.

The data values stored in the table y 235-1 may be encrypted or unencrypted. Encryption is the process, performed by the cryptographic engine 250, of converting ordinary information (plain text) into unintelligible information, known as cipher text, which is unreadable or incomprehensible by interceptors, eavesdroppers, or other unauthorized and unintended persons without secret knowledge (namely, the key needed for decryption). Although the cipher text is unintelligible, it comprises all of the information of the plain text. Decryption is the reverse process, also performed by the cryptographic engine 250, of converting unintelligible cipher text to plain text using a cryptographic key. A cipher is a pair of algorithms or processes that perform this encryption and the reverse decryption. The operation of the cipher is controlled both by the algorithm of the cryptographic engine 250 and by the cryptographic key. The cryptographic key is also known as a crypto variable.

In various embodiments, the cryptographic engine 250 may perform public-key cryptography or secret key cryptography. Public-key cryptography, also known as asymmetric cryptography, is a form of cryptography that uses a pair of different cryptographic keys, known as a public key (used for encryption) and a private key (used for decryption). Examples of public-key ciphers include the Diffie-Hellman algorithm, the RSA (Rivest, Shamir, and Adleman) algorithm, the Cramer-Shoup cryptosystem, ElGamal encryption, and elliptic curve algorithms, but in other embodiments any appropriate public-key cipher may be used. Public-key cryptography is contrasted with secret key cryptography, also known as symmetric cryptography, which uses a single secret key for both encryption and decryption.

In public-key cryptography, the owner of the private key (who submits queries to the database), keeps the private key secret and does not share it with anyone, but the public key may be widely distributed to anyone or any entity who might send data to or submit data to the database via insert or update operations. The public key and the private key are related mathematically and are generated secretly, as an interrelated pair, but the private key cannot be practically derived from the public key. Senders (such as the application 160), who send data to the database, encrypt the data with an encryption cipher that accepts the public key as input, and then the encrypted data that is output is capable of being decrypted only via a decryption cipher that uses the corresponding private key and the encrypted data as input.

The example column characterization data 242 comprises any number of entries, one entry for each column in each table of the database 220. In the example of FIG. 3, the column characterization data 242 comprises the entries 340, 342, and 344. Each entry 340, 342, and 344 comprises an example column identifier field 350, a characterization data field 352, and a characterization enabled field 354. The content of the column identifier field 350, in each entry, uniquely identifies a column in the table 235.

In an embodiment, the content of the characterization data field 352 comprises the unique valid characters that are present in the column identified by the column identifier field 350, in the same entry. The characters in the characterization data 352 are unique because each character in an entry in the characterization data 352 is present only once, even if duplicate occurrences of that character are present in the column identified by the column identifier 350 in the same entry. For example, the character "9" is present in the characterization data 352 of the entry 342 only once, even though the character "9" is present five times (twice in row 1 and three times in row 2) in the column y.address 330. The characters in the characterization data 352 are not necessarily in the same order as the characters appears in the column identified by the column identifier field 350, in the same entry. In an embodiment, the characterization data 352 comprises a range (e.g., entry 344) that encompasses all characters in the column identified by the column identifier 350 in the same entry, for all characters in all rows of the column. The range comprises a beginning, lowest, or smallest value of the range and ending, highest, or largest value of the range, and all of the valid contents of the column (identified by the column identifier 350 in the same entry) of the rows are within the range. In an embodiment, the characterization data 352 is stored in an encrypted format. In an embodiment, the characterization data 352 is implemented as a bitmap.

The characterization enabled field 354 indicates whether or not characterization is enabled for the column identified by the column identifier field 350 in the same entry. If the characterization enabled field 354 in an entry indicates that characterization is enabled, then the DBMS 150 creates or adds contents to the characterization data field 352 in response to values being added or updated in the column identified by the column identifier field 350, in the same entry. If the characterization enabled field 354 in an entry indicates that characterization is not enabled, then the DBMS 150 does not create or does not add contents to the characterization data field 352 in response to values being added or updated in the column identified by the column identifier field 350, in the same entry. In an embodiment, the DBMS 150 initializes the characterization enabled field 354 to indicate that characterization is enabled in response to the creation of each entry in the column characterization data 242.

Figure 4:
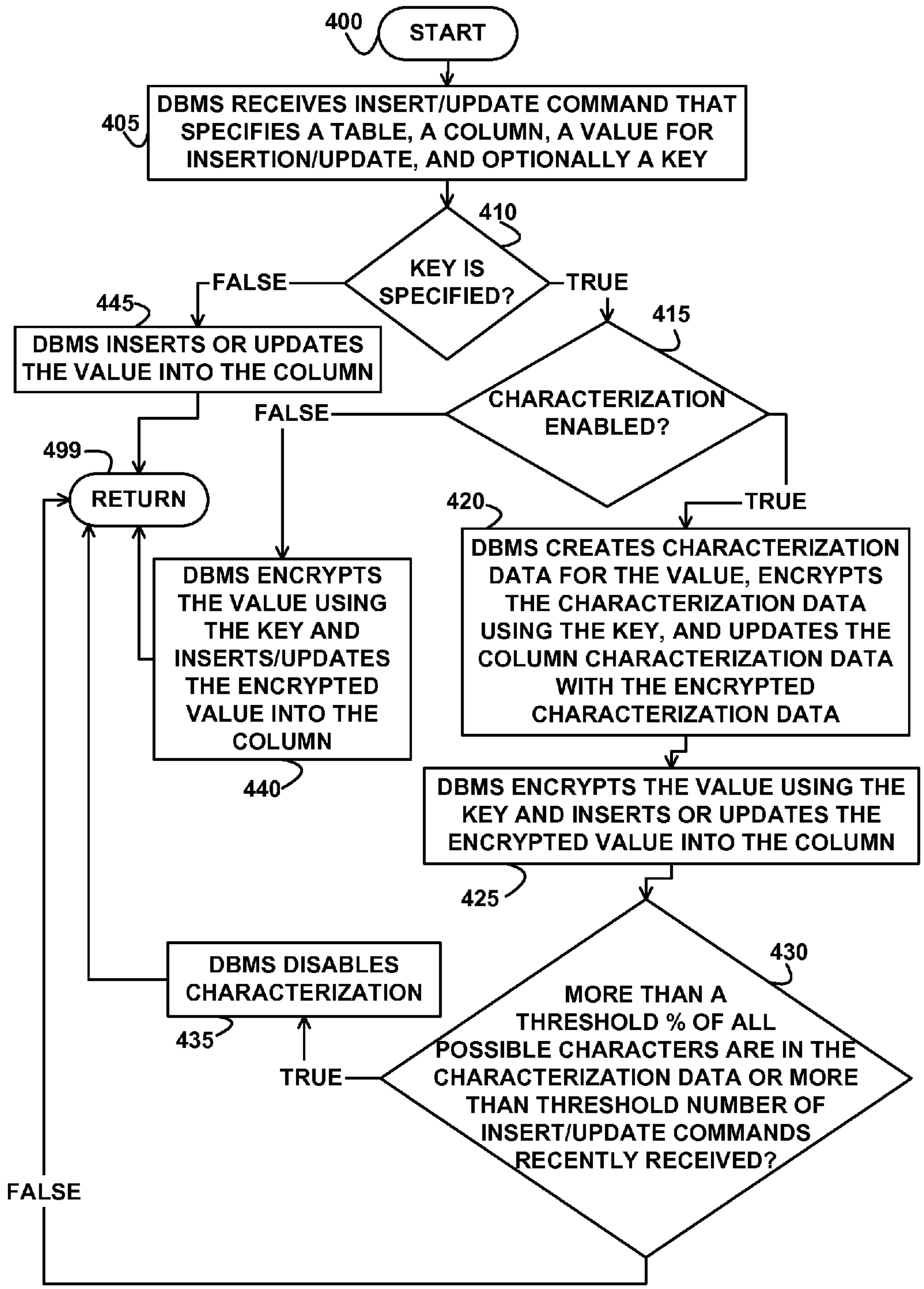
FIG. 4 depicts a flowchart of example processing for insert and update commands, according to an embodiment of the invention.

FIG. 4 depicts a flowchart of example processing for insert and update commands, according to an embodiment of the invention. Control begins at block 400. Control then continues to block 405 where the DBMS 150 receives, from the application 160, an insert or update command 154 that specifies a specified table, a specified column, and a data value that the insert or update command 154 requests to be inserted into a new row in the specified table or that the command requests to be stored into an existing specified row in the specified table, respectively. The insert or update command 154 optionally comprises a cryptographic key and a specification of the existing row.

Control then continues to block 410 where, in response to or as a result of receipt of the insert or update command 154, the DBMS 150 determines whether a cryptographic key is specified by the received insert or update command 154. If the determination at block 410 is true, then the received insert or update command 154 specifies a cryptographic key, so control continues to block 415 where, in response to or as a result of receipt of the insert/update command 154 and the determination that the cryptographic key is specified, the DBMS 150 determines whether characterization is enabled for the column identified by the received insert or update command 154. In an embodiment, the DBMS 150 makes the determination of block 415 by finding an entry in the column characterization data 242 with a column identifier 350 that matches the column identifier specified by the received insert/update command 154 and by determining whether or not the characterization enabled field 354 in the same entry indicates that characterization is enabled.

If the determination at block 415 is true, then characterization is enabled for the column identified by the received insert or update command 154, so control continues to block 420 where the DBMS 150 creates characterization data for the received data value that specifies valid contents of the received data value, encrypts the characterization data using the cryptographic key, and adds the encrypted characterization data to the characterization data field 352 of the entry whose column identifier field 350 matches the specified column. In this way, by creating multiple characterization data for multiple received data values for different rows in a the column specified by multiple insert/update commands 154 and repeatedly adding the created characterization data to the characterization data 352 for each row in the column or by modifying the existing characterization data 352 by the newly created characterization data for the current received command 154, the DBMS 150 creates characterization data 352 that describes or reflects the valid characters for all of the rows in the column.

In an embodiment, the DBMS 150 creates the characterization data that specifies valid contents of the column by adding all of the characters from the data value that are not already present in characterization data to the characterization data and refraining from adding all of the characters from the data value that are already present in the characterization data for the column. In an embodiment, the characterization data 352 in an entry of the column characterization data 242 comprises one occurrence of each character that is present in the rows of the column identified by the column identifier 350, in the same entry of the column characterization data 242.

In an embodiment, the DBMS 150 creates the characterization data that specifies the valid contents of the column by storing a range to the characterization data that encompasses all characters in the received data value and all characters in all rows of the column. The range comprises a beginning, lowest, or smallest value of the range and ending, highest, or largest value of the range, and all of the valid contents of the column of the rows are within the range.

In an embodiment, the DBMS 150 creates the characterization data by creating a bitmap, hash, a hash values, hash codes, a hash sum, or a checksum of the data value specified by the insert/update command 154 and adding the hash to the characterization data 352. In various embodiments, the DBMS 150 creates the characterization data from all data values received from all commands or from a sampling of data values from a sample of commands. In an embodiment, the DBMS 150 samples more data from commands that specify a larger amount of data and samples less data from commands that specify a smaller amount of data.

Control then continues to block 425 where the DBMS 150 encrypts the data value using the cryptographic key and inserts or updates the encrypted value into a row of the column in the database specified by the insert/update command 154.

Control then continues to block 430 where the DBMS 150 determines whether more than a threshold percentage of all possible characters are present in the characterization data 352 for the column or more than a threshold number of insert/update commands have been recently received (within a threshold time period) by the DBMS 150 from the application 160 that sent the insert/update command 154.

If the determination at block 430 is true, then more than a threshold percentage of all possible characters are present in the characterization data 352 for the column or more than a threshold number of insert/update commands 154 have been recently received (within a threshold period of time) by the DBMS 150 from the application 160 that sent the insert/update command 154, so control continues to block 435 where the DBMS 150 disables characterization for the column by setting the characterization enabled field 354 in the entry with a column identifier field 350 that matches the column specified by the insert/update command 154 to indicate that characterization is not enabled or halted. Control then continues to block 499 where the logic of FIG. 4 returns.

If the determination at block 430 is false, then less than or equal to a threshold percentage of all possible characters are present in the characterization data 352 for the column and less than or equal to a threshold number of insert/update commands 154 have been recently received (within a threshold period of time) by the DBMS 150 from the application 160 that sent the insert/update command 154, so control continues to block 499 where the logic of block 499 returns without disabling characterization for the column.

If the determination at block 415 is false, then characterization for the column specified by the received insert/update command 154 is not enabled or halted, so control continues to block 440 where the DBMS 150 encrypts the received data value using the cryptographic key and inserts/updates the encrypted data value into a row in the column specified by the received insert/update command 154, without creating characterization data. Control then continues to block 499 where the logic of FIG. 4 returns.

If the determination at block 410 is false, then the received command does not specify a cryptographic key, so control continues to block 445 where the DBMS 150 inserts or updates the data value into a row in the specified column in the specified table in the database, without creating characterization data. Control then continues to block 499 where the logic of FIG. 4 returns.

Figure 5:
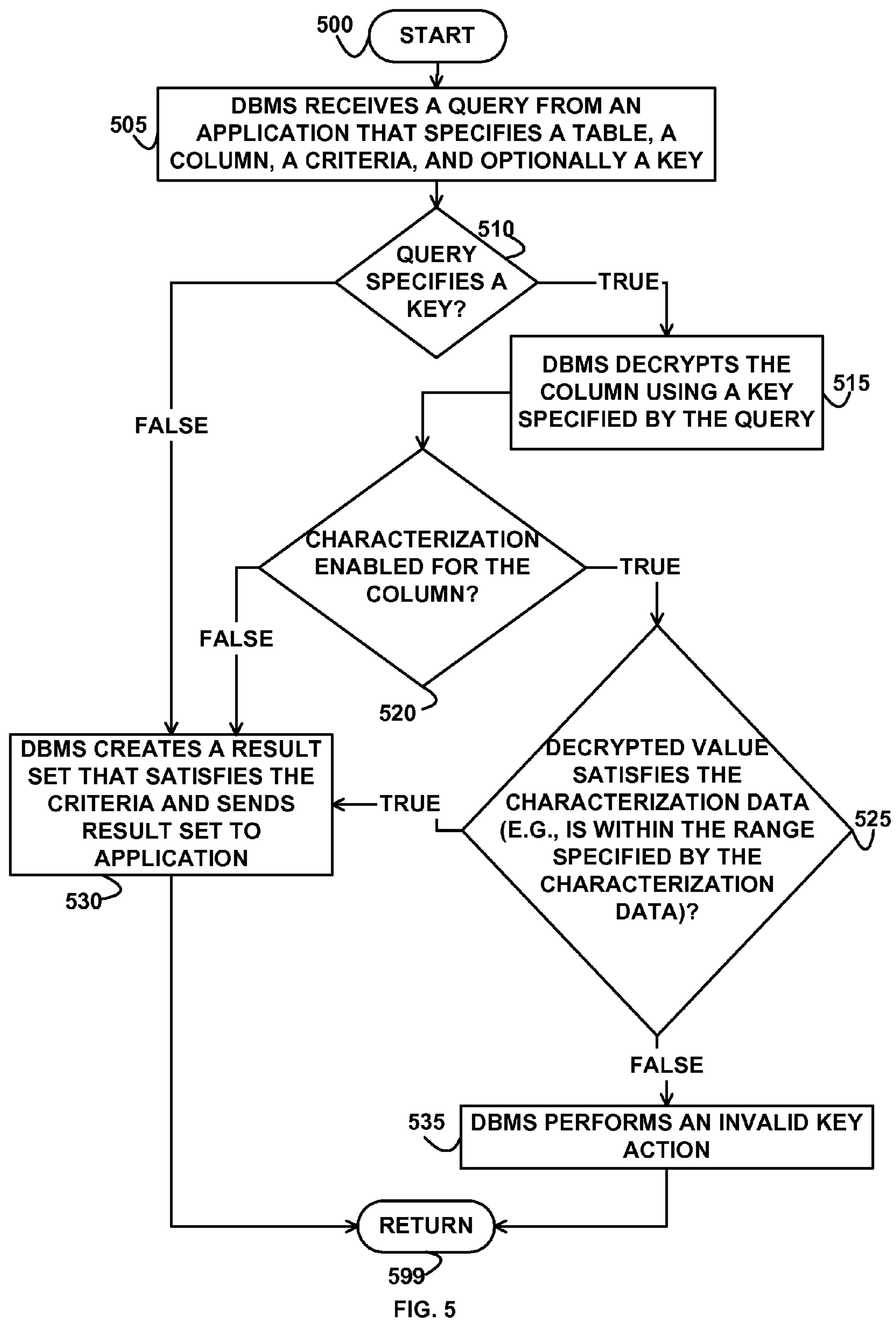
FIG. 5 depicts a flowchart of example processing for a query, according to an embodiment of the invention.

FIG. 5 depicts a flowchart of example processing for a query, according to an embodiment of the invention. Control begins at block 500. Control then continues to block 505 where the DBMS 150 receives (from the application 160) a query command 158 that specifies a specified table, a specified column, a specified criteria, and optionally a specified cryptographic key.

Control then continues to block 510 where the DBMS 150 determines whether the received query specifies a cryptographic key. If the determination at block 510 is true, then the received query specifies a cryptographic key, so control continues to block 515 where the DBMS 150 decrypts all rows of the column using the cryptographic key specified by the query into a decrypted data value. In various embodiments, the received cryptographic key may be the same or different from the cryptographic key that the DBMS 150 used to encrypt data in the specified column. Control then continues to block 520 where the DBMS 150 determines whether characterization is enabled for the column specified by the query command, by reading the characterization enabled field 354 from the entry with a column identifier 350 that matches the specified column.

If the determination at block 520 is true, then characterization is enabled for the column specified by the query command 158, so control continues to block 525 where DBMS 150 determines whether the decrypted data value satisfies or meets the characterization data 352 (e.g., whether all of the characters in the decrypted data value are present in the characterization data 352 or are within or encompassed by the range of valid characters specified by the characterization data 352 for the column).

If the determination at block 525 is true, then the decrypted data value satisfies or meets the characterization data 352 (e.g., all of the characters in the decrypted data value are present in the characterization data 352 or are within or encompassed by the range of valid characters specified by the characterization data 352 for the column), so control continues to block 530 where the DBMS 150 creates and stores to the memory 102 a result set 152 comprising data from the rows of the columns of the database 220 that satisfy or meet the criteria specified by the query command 158 and sends the result set 152 to the application 160 that sent the query command 158. The DBMS 150 creates the result set 152 by finding all rows in the database tables 235 that satisfy the criteria specified by the query 158 and storing those rows into the result set 152 in the memory 102. Control then continues to block 599 where the logic of FIG. 5 returns.

If the determination at block 525 is false, then the decrypted data value does not satisfy or meet the characterization data 352 (e.g., at least one of the characters in the decrypted data value is not present in the characterization data 352 or is outside of or not encompassed by the range of valid characters specified by the characterization data 352 for the column), so control continues to block 535 where the DBMS 150 performs an invalid cryptographic key action. In various embodiments, the invalid cryptographic key action comprises refraining from storing the decrypted data to the result set 152, delaying a response to a next command from the application program 160 that sent the first command, storing information that describes the application program 160 that sent the first command, halting execution of the application program 160 that sent the first command, closing a connection to the application program 160 that sent the first command, notifying an administrator that the decrypted data does not satisfy the valid contents specified by the characterization data 352, returning null or other invalid data to the application program 160, increasing the delay to respond to the command for every command for which the decrypted data value does not satisfy the characterization data 352, saving data to a log that identifies the user, the application program 160, the network address of the application program 160, the query command 158, and/or the stack of the application program 160, and/or calling an exit program provided by a developer or administrator of the DBMS 150. Thus, in an embodiment, the DBMS 150 detects the submission of invalid cryptographic keys and takes an appropriate action in response. In various embodiments, invalid cryptographic keys may result from unauthorized users attempted to access the confidential data of others or may result from an improperly configured environment. Control then continues to block 599 where the logic of FIG. 5 returns.

If the determination at block 520 is false, then characterization is not enabled or halted for the column, so control continues to block 530, as previously described above. Control then continues to block 599 where the logic of FIG. 5 returns.

If the determination at block 510 is false, then the query does not specify a cryptographic key, so control continues to block 530 as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A computer implemented method comprising:

in response to receiving a first command that specifies first data, a first cryptographic key, and a column identifier that identifies a column of rows in a database, encrypting, by a processing device, the first data to encrypted data using the first cryptographic key and storing the encrypted data to a first row in the column in the database;

in response to the receiving the first command, creating characterization data that specifies valid contents of the column of the rows;

wherein the creating the characterization data further comprises:

adding all of the characters from the first data that are not already present in characterization data to the characterization data and refraining from adding all of the characters from the first data that are already present in the characterization data, wherein the characterization data comprises one occurrence of each character that is present in the column of rows; if more than a threshold percentage of all possible characters are present in the characterization data, disabling the adding all of the characters from the first data that are not already present in the characterization data to the characterization data; in response to receiving a query command that specifies a second cryptographic key and the column, decrypting the column using the second key to create decrypted data; and if the decrypted data does not satisfy the valid contents specified by the characterization data, performing an invalid cryptographic key action, and; if more than a threshold number of insert commands have been received within a threshold time period, disabling the creating the characterization data.

2. The method of claim 1, wherein the creating the characterization data further comprises: creating a range, wherein all of the valid contents of the column of the rows are within the range.

3. The method of claim 1, wherein the creating the characterization data further comprises: creating a hash of the first data.

4. The method of claim 1, wherein the creating the characterization data further comprises: encrypting the characterization data.

5. The method of claim 1, further comprising:

if the decrypted data satisfies the valid contents specified by the characterization data, storing the decrypted data to a result set.

6. The method of claim 1, wherein the invalid cryptographic key action is selected from a group consisting of: refraining from storing the decrypted data to a result set, delaying a response to a next command from a program that sent the first command, storing information that describes the program that sent the first command, halting execution of the program that sent the first command, closing a connection to the program that sent the first command, and notifying an administrator that the decrypted data does not satisfy the valid contents specified by the characterization data.

7. A non-transitory computer-readable storage medium encoded with instructions, wherein the instructions when executed comprise:

in response to receiving a first command that specifies first data, a first cryptographic key, and a column identifier that identifies a column of rows in a database, encrypting the first data to encrypted data using the first cryptographic key and storing the encrypted data to a first row in the column in the database;

in response to the receiving the first command, creating characterization data that specifies valid contents of the column of the rows, wherein the characterization data is encrypted; wherein the creating the characterization data further comprises:

adding all of the characters from the first data that are not already present in characterization data to the characterization data and refraining from adding all of the characters from the first data that are already present in the characterization data, wherein the characterization data comprises one occurrence of each character that is present in the column of rows, and; if more than a threshold percentage of all possible characters are present in the characterization data, disabling the adding all of the characters from the first data that are not already present in the characterization data to the characterization data; in response to receiving a query command that specifies a second cryptographic key and the column, decrypting the column using the second key to create decrypted data; if the decrypted data does not satisfy the valid contents specified by the characterization data, performing an invalid cryptographic key action;

if the decrypted data satisfies the valid contents specified by the characterization data, storing the decrypted data to a result set, and; if more than a threshold number of insert commands have been received within a threshold time period, disabling the creating the characterization data.

8. The non-transitory computer-readable storage medium of claim 7, wherein the creating the characterization data further comprises: creating a range, wherein all of the valid contents of the column of the rows are within the range.

9. The non-transitory computer-readable storage medium of claim 7, wherein the invalid cryptographic key action is selected from a group consisting of: refraining from storing the decrypted data to a result set, delaying a response to a next command from a program that sent the first command, storing information that describes the program that sent the first command, halting execution of the program that sent the first command, closing a connection to the program that sent the first command, and notifying an administrator that the decrypted data does not satisfy the valid contents specified by the characterization data.

10. A computer system comprising:

a processor; and memory communicatively coupled to the processor, wherein the memory is encoded with instructions, wherein the instructions when executed by the processor comprise in response to receiving a first command that specifies first data, a first cryptographic key, and a column identifier that identifies a column of rows in a database, encrypting the first data to encrypted data using the first cryptographic key and storing the encrypted data to a first row in the column in the database, in response to the receiving the first command, creating characterization data that specifies valid contents of the column of the rows, wherein the characterization data is encrypted, wherein the creating the characterization data further comprises:

adding all of the characters from the first data that are not already present in characterization data to the characterization data and refraining from adding all of the characters from the first data that are already present in the characterization data, wherein the characterization data comprises one occurrence of each character that is present in the column of rows, and;

if more than a threshold percentage of all possible characters are present in the characterization data, disabling the adding all of the characters from the first data that are not already present in the characterization data to the characterization data;

in response to receiving a query command that specifies a second cryptographic key and the column, decrypting the column using the second key to create decrypted data, if the decrypted data does not satisfy the valid contents specified by the characterization data, performing an invalid cryptographic key action, if the decrypted data satisfies the valid contents specified by the characterization data, storing the decrypted data to a result set, and if more than a threshold number of insert commands have been received within a threshold time period, disabling the creating the characterization data.

11. The computer system of claim 10, wherein the creating the characterization data further comprises:

creating a range, wherein all of the valid contents of the column of the rows are within the range.

12. The computer system of claim 10, wherein the invalid cryptographic key action is selected from a group consisting of: refraining from storing the decrypted data to a result set, delaying a response to a next command from a program that sent the first command, storing information that describes the program that sent the first command, halting execution of the program that sent the first command, closing a connection to the program that sent the first command, and notifying an administrator that the decrypted data does not satisfy the valid contents specified by the characterization data.

* * * * *